(12) United States Patent
Jeong

(10) Patent No.: US 8,926,020 B2
(45) Date of Patent: Jan. 6, 2015

(54) HEADREST MOVING DEVICE

(75) Inventor: Hae Il Jeong, Incheon (KR)

(73) Assignee: Woobo Tech Co., Ltd., Gyeonggi-Do (KR)

( * ) Notice: Subject to any disclaimer, the term of this patent is extended or adjusted under 35 U.S.C. 154(b) by 317 days.

(21) Appl. No.: 13/508,622

(22) PCT Filed: Dec. 14, 2010

(86) PCT No.: PCT/KR2010/008920
§ 371 (c)(1),
(2), (4) Date: May 8, 2012

(87) PCT Pub. No.: WO2011/074849
PCT Pub. Date: Jun. 23, 2011

(65) Prior Publication Data
US 2012/0222511 A1    Sep. 6, 2012

(30) Foreign Application Priority Data

Dec. 15, 2009 (KR) .......................... 10-2009-0124513
Nov. 30, 2010 (KR) .......................... 10-2010-0120624

(51) Int. Cl.
*A47C 7/38* (2006.01)
*B60N 2/48* (2006.01)

(52) U.S. Cl.
CPC ............ *B60N 2/4829* (2013.01); *B60N 2/4835* (2013.01); *B60N 2/4852* (2013.01); *B60N 2/4858* (2013.01); *B60N 2/4885* (2013.01)
USPC ....................................... 297/408

(58) Field of Classification Search
USPC ................................. 297/408, 410
See application file for complete search history.

(56) References Cited

U.S. PATENT DOCUMENTS

| | | | | |
|---|---|---|---|---|
| 4,923,250 A * | 5/1990 | Hattori | .......................... | 297/410 |
| 5,026,120 A * | 6/1991 | Takeda et al. | .................. | 297/408 |
| 5,052,754 A * | 10/1991 | Chinomi | ........................ | 297/408 |
| 6,088,640 A * | 7/2000 | Breed | .............................. | 701/45 |
| 8,172,329 B2 * | 5/2012 | Kim | ................................ | 297/408 |

FOREIGN PATENT DOCUMENTS

| | | |
|---|---|---|
| JP | 05253034 | 10/1993 |
| JP | 07039432 | 2/1995 |
| KR | 1020010026884 | 4/2001 |

* cited by examiner

*Primary Examiner* — Milton Nelson, Jr.
(74) *Attorney, Agent, or Firm* — IPLA P.A.; James E. Bame

(57) ABSTRACT

The present invention relates to a headrest moving device. The headrest moving device includes an ejector casing mounted to a seat frame, a tiltable member tiltably installed in the ejector casing, a stay rod connected to a headrest and passing through the tiltable member, a movable unit having a connector and a mounting holder rotatably coupled to the connector and connected to the stay rod, a screw engaged with the connector in a screw manner of engagement, and a motor for rotating the screw, wherein the tiltable member can be tilted relative to the ejector casing and the mounting holder can be rotated relative to the connector, so that the headrest moving device can easily move the headrest forwards and upwards.

2 Claims, 18 Drawing Sheets

Fig. 14
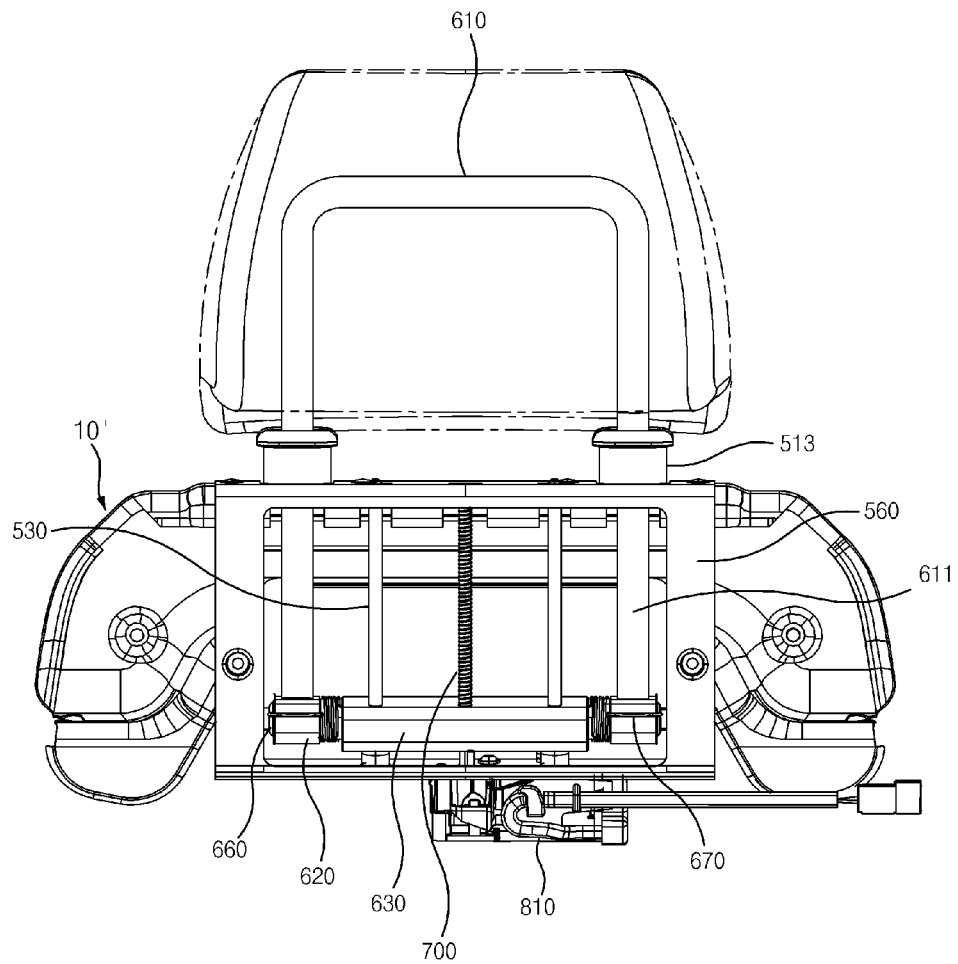
[Fig. 15]
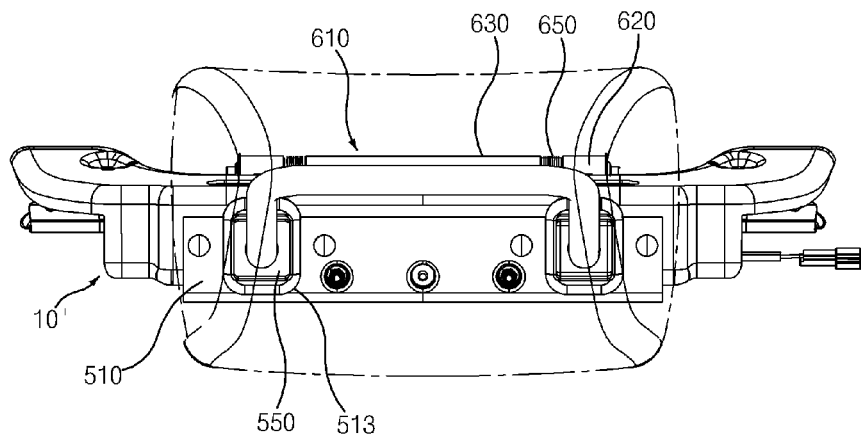

HEADREST MOVING DEVICE

TECHNICAL FIELD

The present invention relates, in general, to headrest moving devices and, more particularly, to a headrest moving device, which includes an ejector casing mounted to a seat frame, a tiltable member tiltably installed in the ejector casing, a stay rod connected to a headrest and passing through the tiltable member, a movable unit having a connector and a mounting holder rotatably coupled to the connector and connected to the stay rod, a screw engaged with the connector by a screw type engagement, and a motor for rotating the screw, wherein the tiltable member can be tilted relative to the ejector casing and the mounting holder can be rotated relative to the connector.

BACKGROUND ART

A car seat is typically provided with a headrest on the top end of the seatback for supporting the head of a passenger. In the related art, a variable movement headrest arrangement has been proposed in U.S. patent application Ser. No. 10/184,675 filed on Jun. 28, 2002. The variable movement headrest arrangement can quickly move a support forwards in the case of a car collision (a chain-reaction collision) and supports the head of a passenger such that the head of the passenger can be prevented from quickly leaning backwards, and thereby prevents the passenger from receiving serious neck injuries. As shown in FIG. 1, the variable movement headrest arrangement is configured such that, when the back of a passenger strikes a hit plate 1A, which is rotatably installed in the back of a passenger seat by using a hinge shaft, in response to the impact formed by a car collision (a chain-reaction collision), and when the striking force is stronger than the elastic force of a spring 1B biasing the hit plate forwards, the hit plate is pushed backwards and thereby a headrest 3A connected to the upper end of the hit plate by a rod 2A leans forwards.

When the hit plate 1A is pushed backwards by the impact applied from the back of the passenger, the headrest 3A can be moved forwards to a position at which the headrest can support the head of the passenger. However, when the head of the passenger leans backwards after the back of the passenger has impacted the hit plate and when the contractile force of the extended spring 1B in the above state is stronger than the striking force applied to the hit plate, the hit plate may be quickly returned forwards to its original position and thereby the headrest may be returned backwards to its original position. Therefore, the variable movement headrest arrangement is problematic in that it cannot effectively support the head of the passenger which leans backwards slightly too late when the headrest is being moved backwards or has been moved backwards.

DISCLOSURE OF INVENTION

Technical Problem

Accordingly, the present invention has been made keeping in mind the above problems occurring in the related art, and is intended to provide a headrest moving device, which can easily move a headrest forwards and upwards.

Solution to Problem

In an aspect, the present invention provides a headrest moving device, comprising: an ejector casing mounted to a seat frame; a tiltable member rotatably installed in the ejector casing; a stay rod connected to a headrest and passing through the tiltable member; a movable unit having a connector and a mounting holder rotatably coupled to the connector and connected to the stay rod; a screw engaged with the connector in a screw manner of engagement; and a motor for rotating the screw, wherein the tiltable member can be tilted relative to the ejector casing and the mounting holder can be rotated relative to the connector.

The mounting holder may be provided with an insert hole, into which the stay rod is inserted, and the tiltable member may be provided with an ejecting hole, through which the stay rod passes, wherein, at at least one height, a central axis passing through both a center of the ejecting hole and a center of the insert hole may be inclined relative to the screw, so that, when the connector is moved upwards, both the mounting holder and the tiltable member may be rotated counterclockwise relative to the connector.

The headrest moving device may further comprise: a spring connected to the connector at a first end thereof and connected to the mounting holder at a second end thereof; and a stopper for limiting an angle that the mounting holder rotates relative to the connector.

Advantageous Effects of Invention

An above-mentioned headrest moving device according to the present invention has the following advantages.

The headrest moving device includes the ejector casing mounted to the seat frame, the tiltable member tiltably installed in the ejector casing, the stay rod connected to the headrest and passing through the tiltable member, the movable unit having the connector and the mounting holder rotatably coupled to the connector and connected to the stay rod, the screw engaged with the connector by the screw type engagement, and the motor rotating the screw, wherein the tiltable member can be tilted relative to the ejector casing and the mounting holder can be rotated relative to the connector, so that the headrest moving device can easily move the headrest upwards and forwards.

The mounting holder is provided with an insert hole, into which the stay rod is inserted, and the tiltable member is provided with the ejecting hole, through which the stay rod passes, wherein, at at least one height, the central axis passing through both the center of the ejecting hole and the center of the insert hole is inclined relative to the screw, so that, when the connector is moved upwards, both the mounting holder and the tiltable member are rotated counterclockwise with respect to the connector, and thereby, when the connector is moved further upwards, the counterclockwise rotating angle of the mounting holder relative to the connector becomes larger. Therefore, when a passenger moves the movable unit upwards or downwards so as to adjust the height of the headrest, the forward moving distance of the headrest is negligible until the headrest has reached a predetermined height, so that the headrest moving device can prevent the passenger from feeling uncomfortable.

Further, the headrest moving device is provided with both the spring, which is connected to the connector at the first end thereof and is connected to the mounting holder at the second end thereof, and the stopper capable of limiting the rotating angle of the mounting holder relative to the connector, so that, even when the mounting holder is rotatably connected to the connector with no external force imposed thereon, the mounting holder can maintain a predetermined angle relative to the connector.

Therefore, the stay rod can be easily inserted into the insert hole of the mounting holder, so that the headrest moving device can be easily assembled within a short period of time.

BRIEF DESCRIPTION OF DRAWINGS

FIG. 14 is a rear perspective view of FIG. 13;

FIG. 15 is a plane view of FIG. 13;

MODE FOR THE INVENTION

Hereinbelow, preferred embodiments of the present invention will be described in detail with reference to the accompanying drawings.

For reference, in the following description, elements of the present invention, which are the same as conventional elements, are referred to the above-mentioned related art, and a detailed description of those elements will be omitted.

Figure 1:
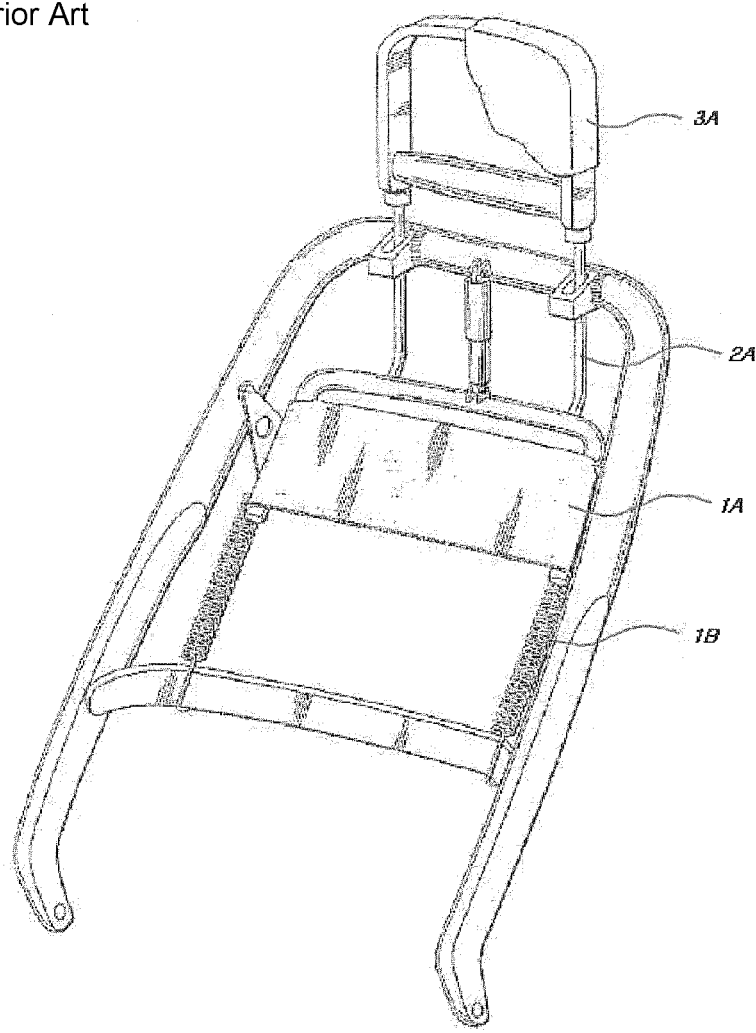
FIG. 1 is a perspective view illustrating an example of a conventional movable headrest.
Figure 2:
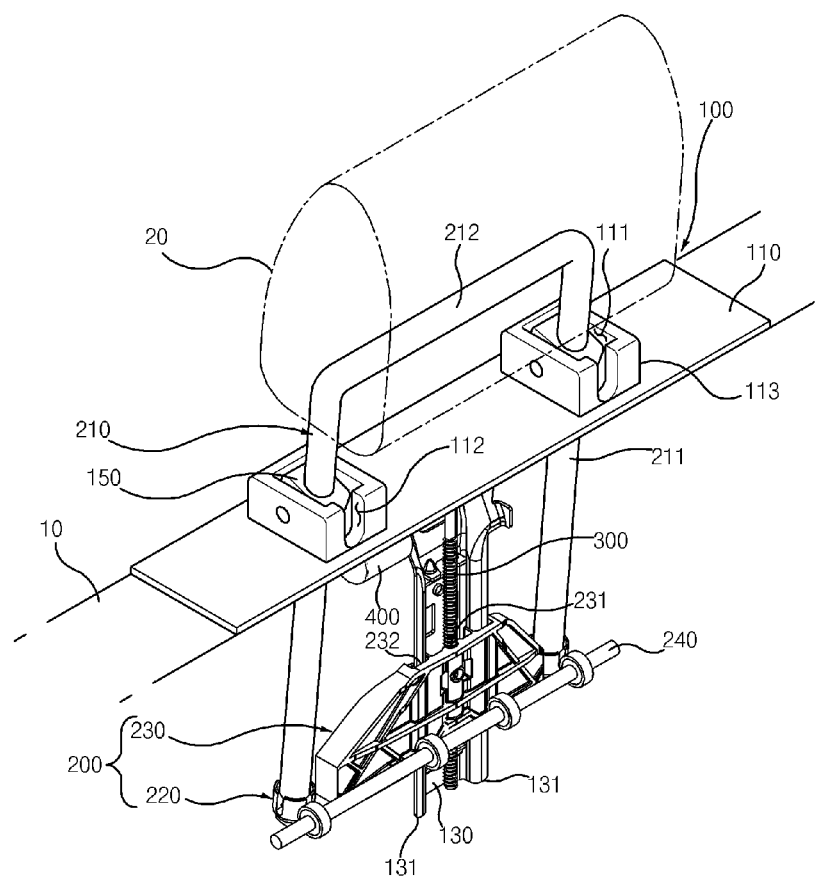
FIG. 2 is a perspective view illustrating a headrest moving device according to a first preferred embodiment of the present invention.
Figure 3:
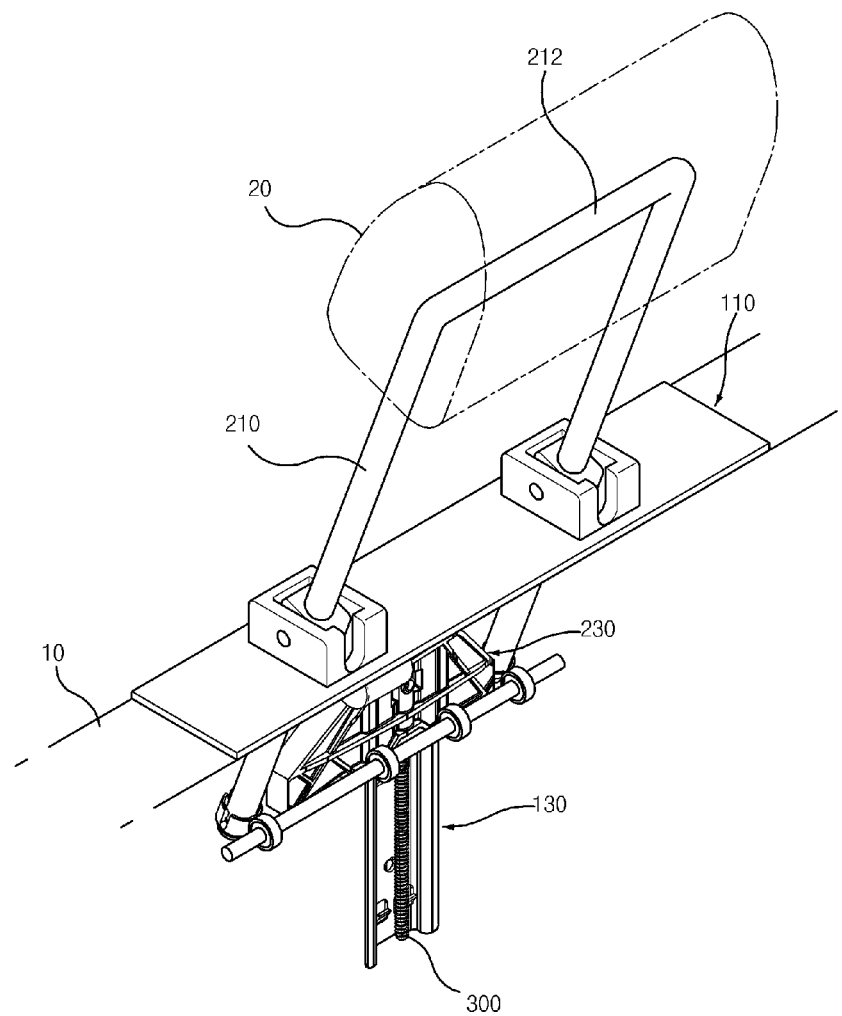
FIG. 3 is a perspective view illustrating the headrest moving device according to the first preferred embodiment of the present invention.
Figure 4:
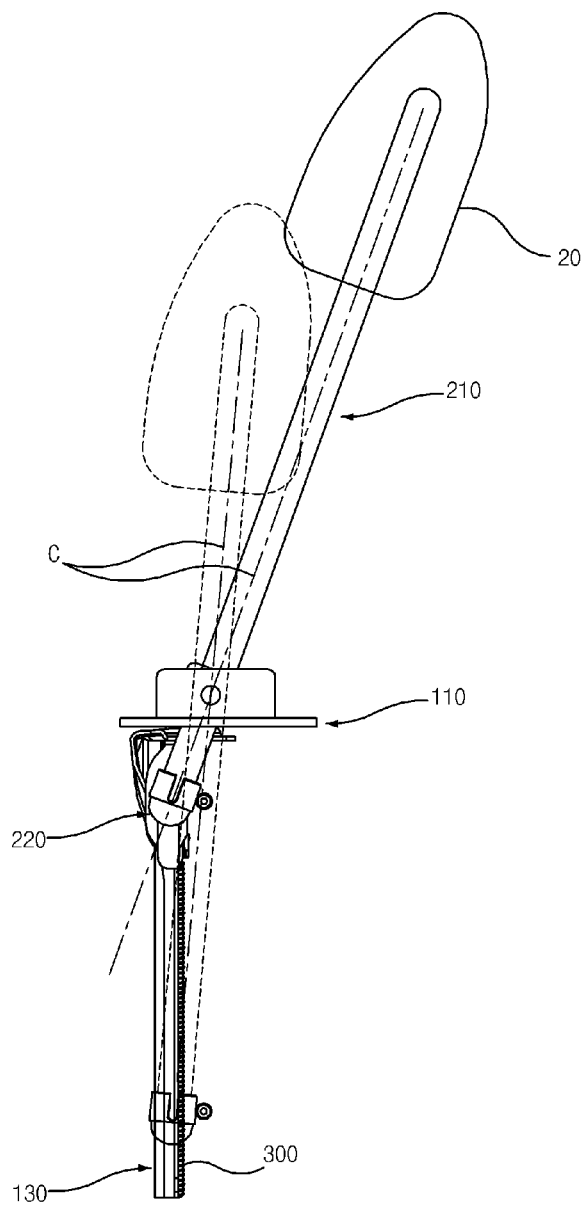
FIG. 4 is a side view of FIG. 2.

As shown in FIG. 2 through FIG. 4, a headrest moving device according to a first embodiment of the present invention includes an ejector casing 113 mounted to a seat frame 10, a tiltable member 150 tiltably installed in the ejector casing 113, a stay rod 210 connected to a headrest 20 and passing through the tiltable member 150, a movable unit 200 having a connector 230 and a mounting holder 220 rotatably coupled to the connector 230 and connected to the stay rod 210, a screw 300 engaged with the connector 230 by a screw type engagement, and a motor 400 for rotating the screw 300, wherein the tiltable member 150 can be tilted relative to the ejector casing 113 and the mounting holder 220 can be rotated relative to the connector 230.

A fixed unit 100 includes an upper plate 110 on which the ejector casing 113 is mounted. The fixed unit 100 also includes a support guide 131 and is installed on the seat frame 10.

The ejector casing 113 receives therein the tiltable member 150 which will be described later herein. The ejector casing 113 also has a through hole 111, through which the stay rod 210 passes.

As shown in FIG. 2, the fixed unit 100 has the upper plate 110, which is installed at an upper location. The support unit 130 is mounted to the center of the lower surface of the upper plate.

The upper plate 110 is a flat member, which is horizontally installed and has through openings in opposite sides thereof, each of which receives an ejector casing 113 therein. The through openings of the upper plate 110 communicate with the through holes 111 of the respective ejector casings 113.

The support unit 130 has a plate shape and is provided with the support guides 131 along opposite side edges thereof.

Each of the support guides 131 is formed by bending each side edge of the support unit 130 such that the support guide 131 has a circular or arc-shaped cross-section.

The support guide 131 is a long part which extends in a vertical direction.

The support unit 130 is vertically arranged and has a bent part in an upper end thereof. The bent part of the support unit is mounted to the lower surface of the upper plate 110, so that the support unit 130 can be easily mounted to the upper plate 110. Unlike the above-mentioned structure, the support unit 130 may be integrated with the upper plate 110 into a single structure.

The ejector casings 113 are installed in respective through openings which are vertically formed through the opposite sides of the upper plate 110.

Further, the ejector casing 113 is installed in the upper plate 110 of the fixed unit 100, and the tiltable member 150, through which the stay rod 210 of the movable unit 200 passes as will be described later herein, is tiltably installed in the through hole 111 of the ejector casing 113.

The tiltable member 150 is provided with an ejecting hole, through which the stay rod 210 passes.

Due to the tiltable member 150, the stay rod 210 can be smoothly tilted forwards or backwards without generating noise.

Further, the ejector casing 113 is provided with a notch 112 for preventing the stay rod 210 from interfering with the ejector casing when the stay rod 210 is tilted.

The movable unit 200 includes the mounting holder 220 connected to the stay rod 210 and the connector 230 supported by the support guide 131.

The stay rod 210 includes vertical rods 211, which are arranged in opposite sides of the stay rod and pass through respective tiltable members 150 installed in the ejector casings 113, and a horizontal rod 212 connecting the opposite vertical rods 211 to each other.

The connector 230 is connected to the support unit 130 at a right angle and is arranged in a horizontal position.

The connector 230 has a plate shape, with insert holes 232 vertically formed through opposite sides of the connector and receiving the support guides 131.

Further, the connector 230 has a plurality of ribs capable of increasing the durability of the connector 230.

The connector 230 also has a through hole 231 in a location between the two insert holes 232. The inner surface of the through hole 231 is threaded.

Further, the mounting holder 220 is provided in each side of the connector 230. The vertical rods 211 of the stay rod 210 are mounted to the mounting holders 220.

The mounting holders 220 and the connector 230 are connected to each other by a shaft 240.

In the front of both the mounting holders 220 and the connector 230, a plurality of shaft bearings having respective shaft holes for receiving the shaft 240 are integrated with both the mounting holders and the connector.

The mounting holder 220 is provided with an insert hole, into which the stay rod 210 is inserted.

Therefore, both the mounting holder 220 and the stay rod 210 can be rotated relative to the connector 230.

Due to both the shaft 240 and the shaft bearings, the strength and durability of both the mounting holder 220 and the connector 230 can be increased.

The mounting holder 220 may be provided with a sleeve adjuster (not shown), which is a unit for adjusting the height of the headrest 20. Due to the sleeve adjuster, the stay rod 210 can be easily mounted to the mounting holder 220.

The fixed unit 100 and the movable unit 200 of the headrest moving device impart the device with the advantages of requiring a small amount of space because it occupies a small amount of space and reducing its weight.

The motor 400 uses a geared motor and moves the movable unit 200 upwards or downwards.

The motor 400 is mounted to the lower surface of the upper plate 110 of the fixed unit 100.

The screw 300 is connected to the output shaft of the motor 400 and is engaged with the movable unit 200 in a screw manner of engagement.

The output shaft of the motor 400 may be connected to the screw 300 by a bevel gear.

The screw 300 is vertically arranged and is rotatably held at the upper end thereof by the upper plate 110 of the fixed unit 100.

Further, the screw 300 is inserted into the through hole 231 of the connector 230 and is engaged with the connector 230 in a screw manner of engagement.

Figure 5:
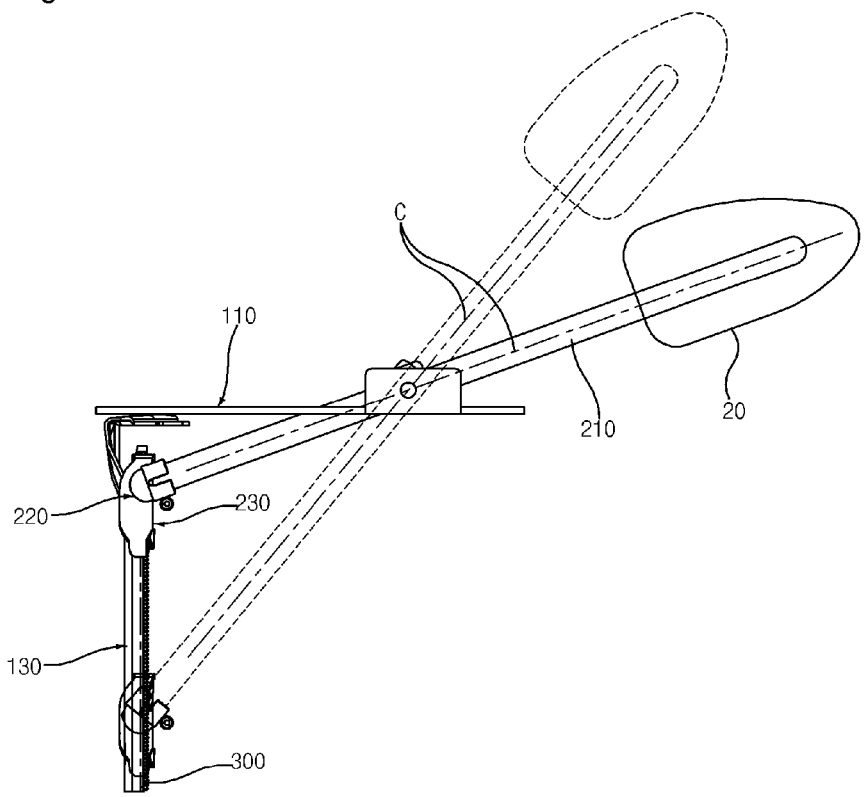
FIG. 5 is a side view illustrating a headrest moving device according to a second preferred embodiment of the present invention.
Figure 6:
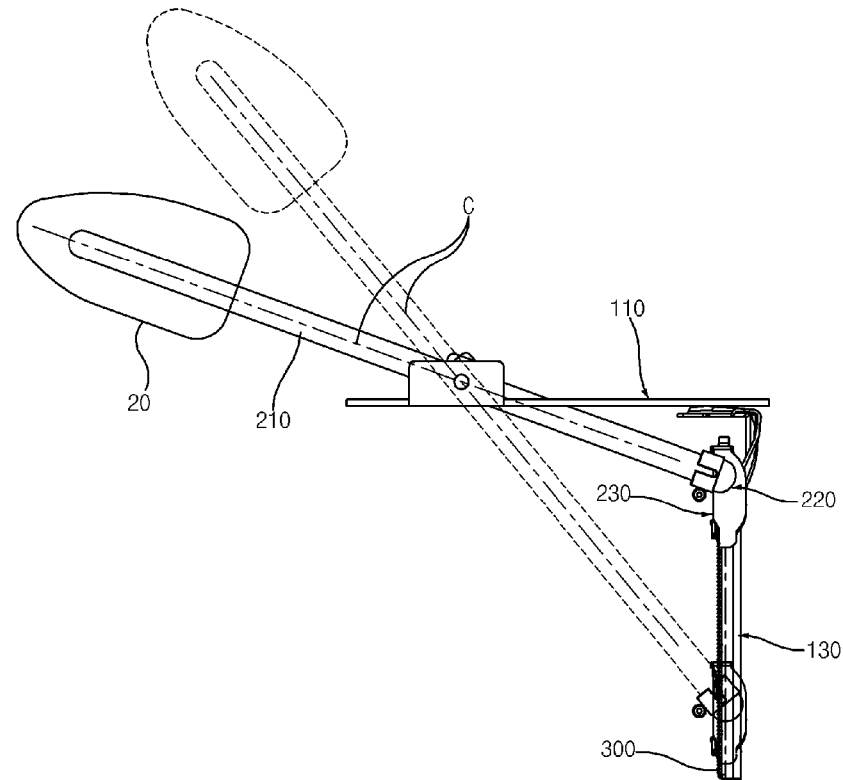
FIG. 6 is a side view illustrating the headrest moving device according to the second preferred embodiment of the present invention.

As shown in FIGS. 4, 5 and 6, at at least one height, a central axis C passing through both the center of the ejecting hole of the tiltable member 150 and the center of the insert hole of the mounting holder 220 is inclined relative to the screw 300, so that, when the connector 230 is moved upwards, both the mounting holder 220 and the tiltable member 150 are rotated counterclockwise or clockwise with respect to the connector.

Hereinbelow, how the embodiment having the above-mentioned construction operates will be described.

When a user manipulates a switch connected to the motor 400, the motor 400 starts and the output shaft of the motor 400 rotates which also causes the screw 300 to rotate.

When the screw 300 rotates, the movable unit 200 moves upwards or downwards in accordance with the direction in which the screw rotates.

Both the movable unit 200 and the stay rod 210 move upwards or downwards at the same time.

When the movable unit 200 is moved upwards as described above, the connector 230 is moved upwards under the guide of the support guides 131 and the mounting holder 220 is rotated with respect to the connector 230, so that the angle of the headrest 20 relative to a horizontal surface can be changed.

In other words, as shown in FIGS. 3 and 4, the stay rod 210 is moved upwards and forwards at the same time, so that the headrest 20 connected to the stay rod 210 can support the head of a passenger and thereby prevent the head of the passenger from quickly inclining backwards in a car collision, such as in a chain-reaction collision.

Further, the device may further comprise a sensor (not shown) for sensing both a difference in speed between this car and a following car and a distance between the cars, and a control unit (not shown) for receiving signals output from the sensor and operating the motor 400 so as to move the movable unit 200 upwards and forwards when it determines that there is a possibility that this car and the following car will collide.

When both the sensor and the control unit are provided in the device as described above, the headrest 20 can be automatically moved upwards and forwards at the same time when there is a possibility of a rear collision, thus preventing the head of the passenger from quickly leaning backwards.

The headrest moving device can prevent the head of a passenger from quickly leaning backwards and the above-mentioned simple structure thereof can reduce its noise and weight.

Further, when the distance between the center (the central axis) of the ejecting hole and the center (the central axis) of screw 300 increases, the rotating angle of the headrest 20 becomes larger. Therefore, when the distance between the centers is substantially increased, the headrest 20 can be folded forwards or backwards. Therefore, when it is not necessary to use the headrest 20, the headrest 20 may be folded to enlarge the angle of a passenger's field of vision.

When the center (the central axis) of the ejecting hole is arranged in front of the center (the central axis) of the screw 300, the headrest may be folded forwards as shown in FIG. 5, and when the relationship between the centers is reversed, the headrest may be folded backwards as shown in FIG. 6.

Figure 7:
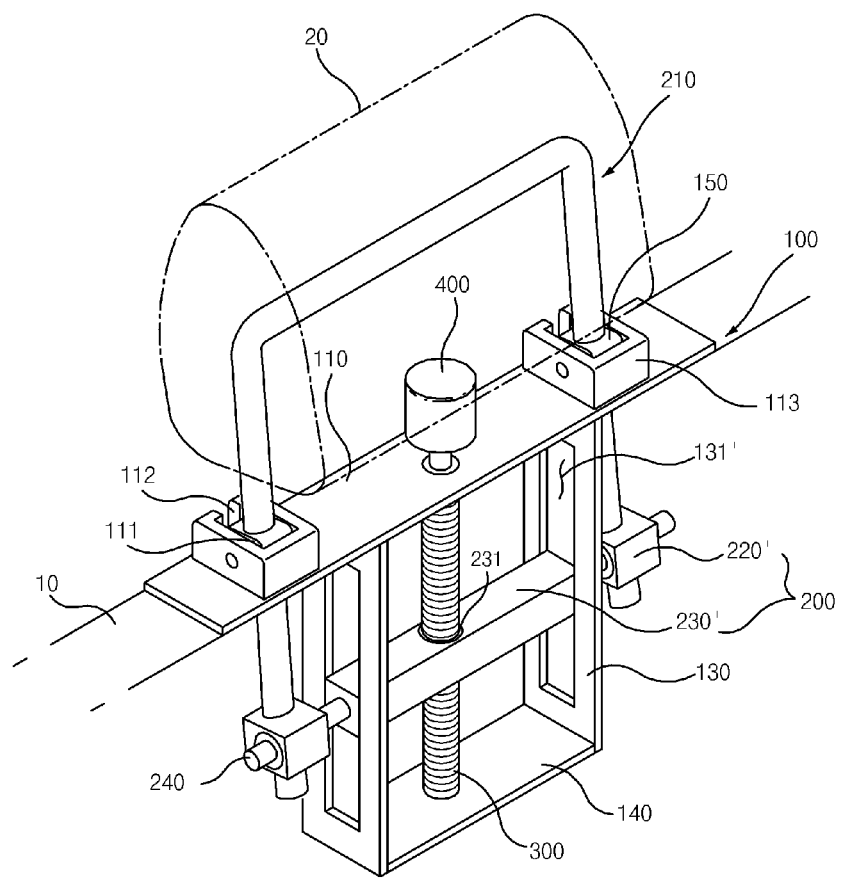
FIG. 7 is a perspective view illustrating a headrest moving device according to a third preferred embodiment of the present invention.

FIG. 7 is a perspective view illustrating a headrest moving device according to a third embodiment of the present invention.

As shown in FIG. 7, the headrest moving device according to the second embodiment includes an ejector casing 113 mounted to a seat frame 10, a tiltable member 150 tiltably installed in the ejector casing 113, a stay rod 210 connected to a headrest 20 and passing through the tiltable member 150, a movable unit 200 having a connector 230' and a mounting holder 220' rotatably coupled to the connector 230' and connected to the stay rod 210, a screw 300 engaged with the connector 230' in a screw type engagement, and a motor 400 for rotating the screw 300, wherein the tiltable member 150 can be tilted relative to the ejector casing 113 and the mounting holder 220' can be rotated relative to the connector 230'.

In the following description, further explanation of elements that are the same as those of the above-mentioned first embodiment will be omitted.

The fixed unit 100 of the third embodiment includes an upper plate 110 arranged in an upper part, support units 130' mounted to the lower surface of the upper plate at opposite sides, and a lower plate 140 connecting the opposite support units 130' to each other.

The opposite support units 130' are arranged at locations between the two ejector casings 113 provided on the upper plate 110.

In this embodiment, the support guide 131' is formed by a guide opening.

The support guide 131' is axially formed along the support unit 130'.

Further, the lower plate 140 is provided with a screw hole, through which the screw 300 passes. The screw hole allows the screw 300 to rotate relative to the lower plate 140. Further, the lower plate 140 can stably hold the lower end of the screw 300.

The connector 230' of this embodiment uses a bar having a square cross-section, with a through hole 231 formed through the center of the connector so that the screw 300 can pass through the through hole.

A shaft 240' is provided at each end of the connector 230'.

In this embodiment, the mounting holder 220' has a block shape, with a shaft hole formed through the mounting holder so that the shaft 240' can pass through the through hole.

Thus, the mounting holder 220' can be rotated relative to the connector 230'.

Further, the mounting holder 220' is provided with an insert hole, into which the stay rod 210 is inserted.

Hereinbelow, the operation of the headrest moving device will be described.

The motor 400, which may be installed on the upper surface of the upper plate 110, is connected to the screw 300 which passes through the upper plate 110.

Figure 8:
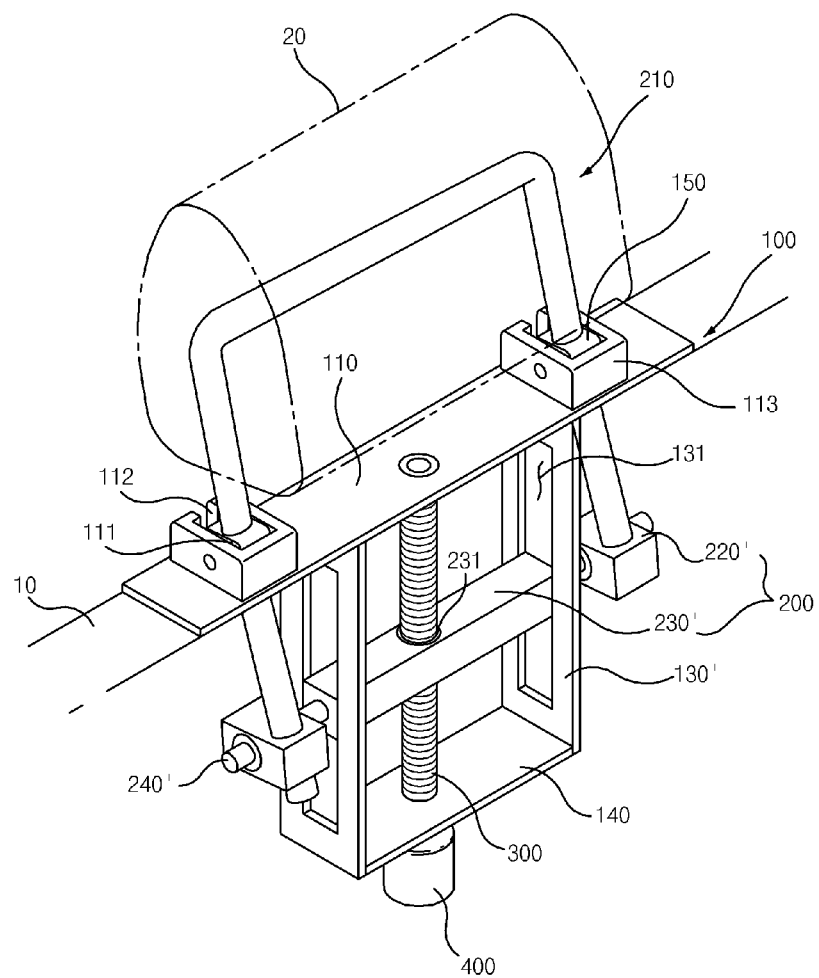
FIG. 8 is a perspective view illustrating the headrest moving device according to the third preferred embodiment of the present invention.
Figure 9:
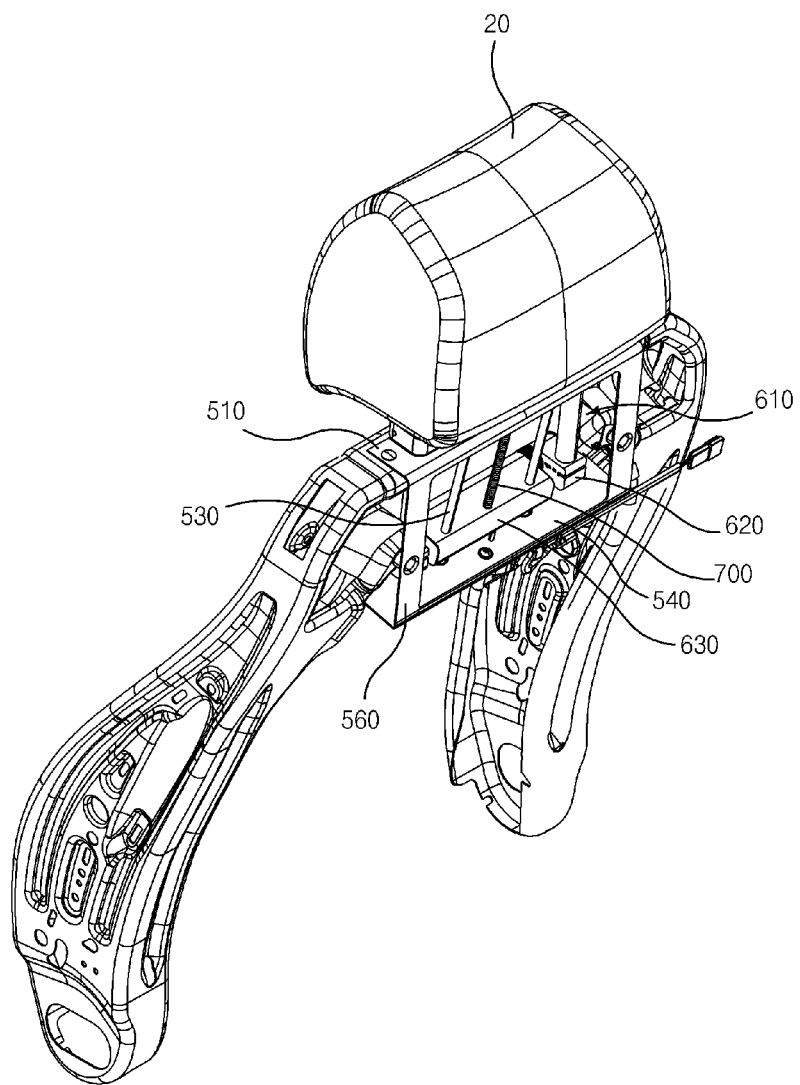
FIG. 9 is a rear perspective view illustrating the installed state of a headrest moving device according to a fourth embodiment of the present invention.
Figure 10:
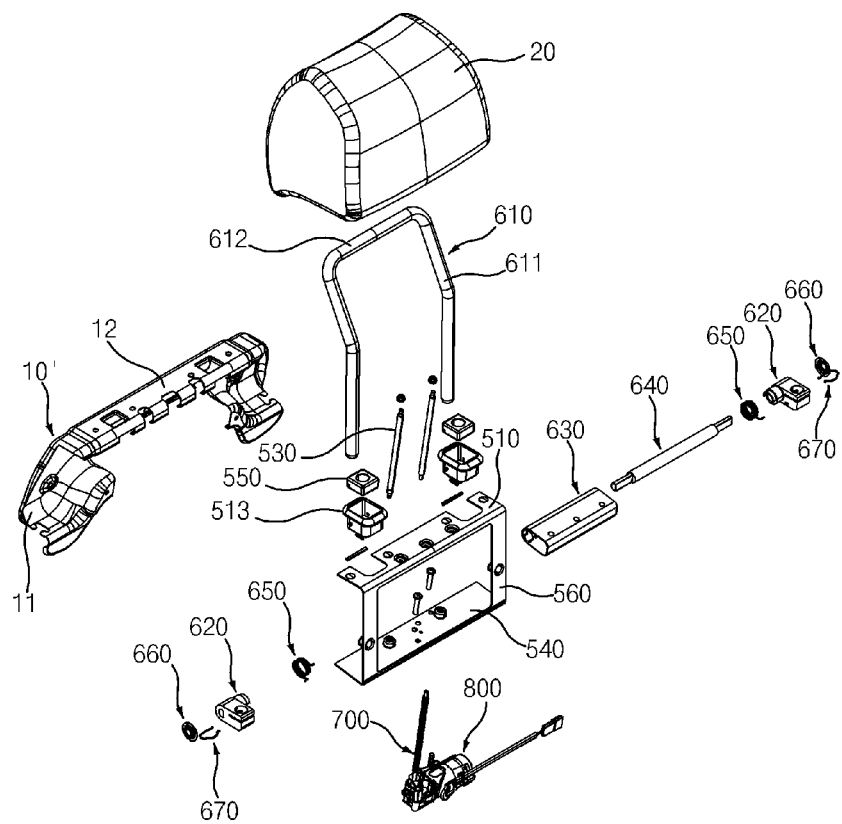
FIG. 10 is an exploded perspective view illustrating the headrest moving device according to the fourth embodiment of the present invention.
Figure 11:
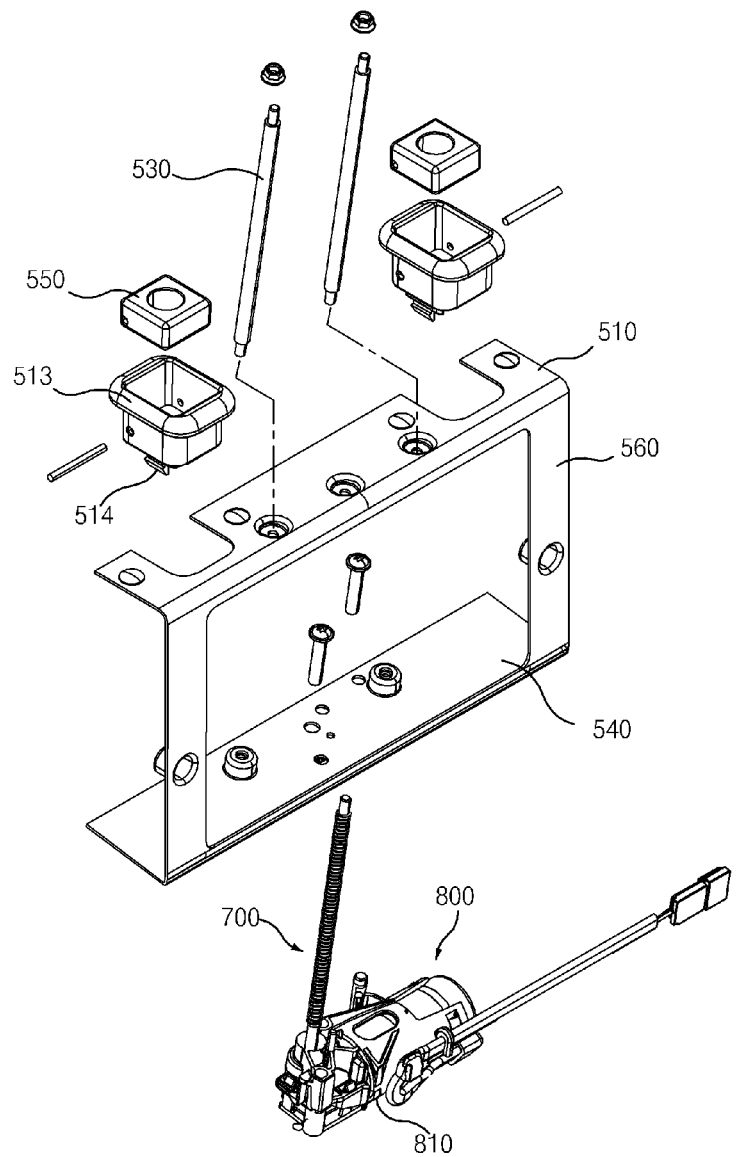
FIG. 11 is an enlarged view of a part of FIG. 10.

Further, as shown in FIG. 8, the motor 400 may be mounted to the lower plate 140.

When a user manipulates a switch connected to the motor 400, the motor 400 starts and the output shaft of the motor 400 rotates so that the screw 300 is rotated.

When the screw 300 rotates, the movable unit 200 can be moved upwards or downwards in accordance with a rotating angle of the screw.

Both the movable unit 200 and the stay rod 210 can be moved upwards or downwards at the same time.

When the movable unit 200 is moved upwards as described above, the connector 230' is moved upwards under the guide of the support guides 131' and the mounting holder 220' is rotated with respect to the connector 230', so that the angle of the headrest 20 relative to a horizontal surface can be changed.

Hereinbelow, a headrest moving device according to a fourth embodiment of the present invention will be described.

As shown in FIGS. 9 through 19, the headrest moving device of the fourth embodiment includes an ejector casing 513 mounted to a seat frame 10', a tiltable member 550 tiltably installed in the ejector casing 513, a stay rod 610 connected to a headrest 20 and passing through the tiltable member 550, a movable unit having a connector 630 and a mounting holder 620 rotatably coupled to the connector 630 and connected to the stay rod 610, a screw 700 engaged with the connector 630 in a screw type of engagement, and a motor 800 for rotating the screw 700, wherein the tiltable member 550 can be tilted relative to the ejector casing 513 and the mounting holder 620 can be rotated relative to the connector 630.

In the following description, further explanation of the construction and operational effects that are the same as those of the above-mentioned embodiments will be omitted.

The fixed unit holds the ejector casing 513 and is installed on the seat frame 10'.

The seat frame 10' includes a front panel 11 and an upper panel 12, which is formed by bending the upper part of the front panel 11 backwards. Opposite sides of the upper panel 12 are provided with respective through openings, in which respective ejector casings 513 are installed.

The ejector casing 513 is provided with a vertical through hole, through which the stay rod 610 passes.

The through hole is formed in the ejector casing 513 such that the through hole is eccentric backwards.

Further, a seat groove is formed in the upper part of the ejector casing 513 such that the seat groove communicates with the through hole. A pin insert hole is laterally formed in the ejector casing such that the pin insert hole communicates with the seat groove.

The tiltable member 550, through which the stay rod 610 passes as will be described later, is rotatably installed in the ejector casing 513.

The tiltable member 550 is provided with an ejecting hole, through which the stay rod 610 passes.

The tiltable member 550 is seated in the seat groove of the ejector casing 513.

A pin is inserted into the lower part of the front surface of the tiltable member 550. The pin is inserted into the pin insert hole of the ejector casing 513.

The tiltable member 550 is installed in the seat groove of the ejector casing 513 such that the tiltable member is eccentric backwards. Therefore, a space is defined between the front surface of the tiltable member 550 and the inner surface of the ejector casing 513. Because of the space, even when the stay rod 610 is tilted forwards, it is possible to prevent the stay rod 610 from interfering with the ejector casing 513.

The ejector casing 513 is provided with hooks 514 on opposite sides of the lower end thereof, so that, when the ejector casing 513 is fitted into the through opening of the seat frame 10', the hooks 514 are hooked by the upper panel 12 of the seat frame 10' so that the ejector casing 513 can be installed in the seat frame 10' in a one touch method of installation.

The fixed unit may include a mounting bracket, which has an upper plate 510 mounted to the upper panel 12 of the seat frame 10', a lower plate 540 and side plates 560 connecting the opposite ends of the upper plate 510 and the lower plate 540 to each other, with a support unit 530 held by both the upper plate 510 and the lower plate 540.

The upper plate 510 is provided with a through opening, into which the ejector casing 513 is fitted.

Each of the upper plate 510 and the lower plate 540 is provided at opposite sides thereof with first through holes for receiving respective support units 530. Each of the upper plate 510 and the lower plate 540 is also provided with a second through hole at a location between the first through holes. The screw 700 passes through the second through holes. The through opening formed in the upper plate 510 is placed in front of the second through hole of the upper plate. Further, the second through hole formed in the upper plate 510 is placed in back of the second through hole formed in the lower plate 540.

The lower plate 540 is an inclined plate so that an acute angle is defined between the lower plate 540 and each side plate 560.

The support unit 530 has a cylindrical column shape, with threads formed around the outer circumferential surfaces of the upper and lower ends of the support unit.

The upper and lower ends of the support unit 530 are inserted into the first through holes formed in the upper and lower plates of the mounting bracket and are tightened by respective nuts.

Further, a nut seat for seating a nut therein is provided in each of the upper plate 510 and the lower plate 540 of the mounting bracket such that the nut seat communicates with the first through hole.

The support unit 530 functions as a reinforcing member when an external impact is applied to the headrest moving device. The support unit 530 also functions to support the connector 630 so that rotation of the connector can be prevented.

The movable unit includes the stay rod 610, which is connected to the headrest 20 and passes through the ejector casing 513, the mounting holder 620 connected to the stay rod 610, and the connector 630 rotatable connected to the mounting holder 620.

The stay rod 610 includes vertical rods 611, which are arranged on opposite sides and are inserted into the ejecting holes of the tiltable members 550, and a horizontal rod 612 connecting the opposite vertical rods 611 to each other.

Each of the vertical rods 611 is inclined forwards at the upper end thereof.

Each of the vertical rods 611 is provided with a fitting hole in the lower end of the sidewall thereof.

Both the mounting holder 620 and the connector 630 are configured such that the shaft 640 passes through them and thereby the mounting holder 620 is rotatably connected to the connector 630 by the shaft.

Figure 12:
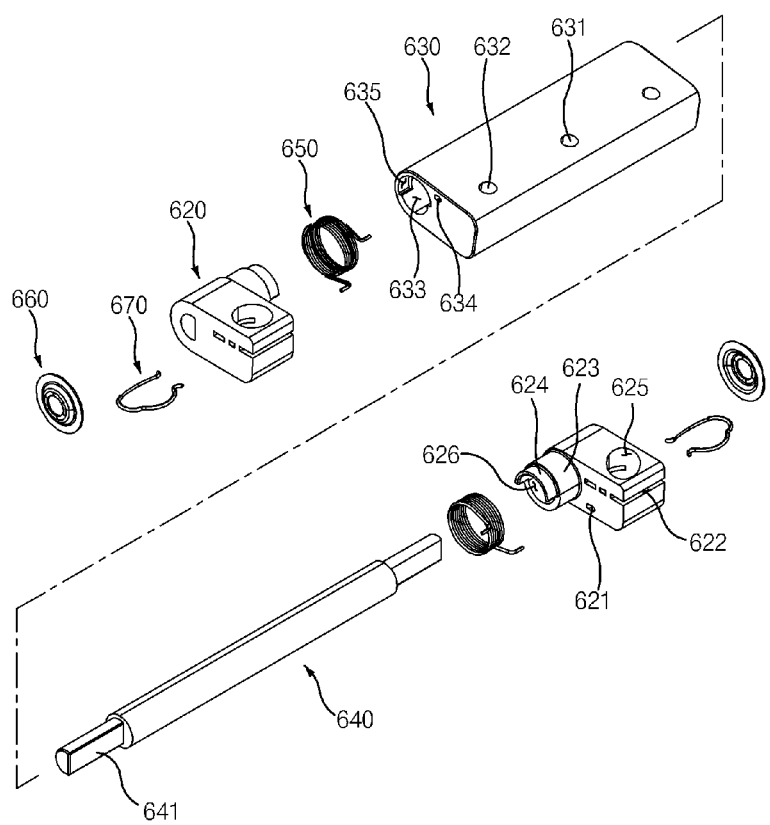
FIG. 12 is an enlarged view of another part of FIG. 10.
Figure 13:
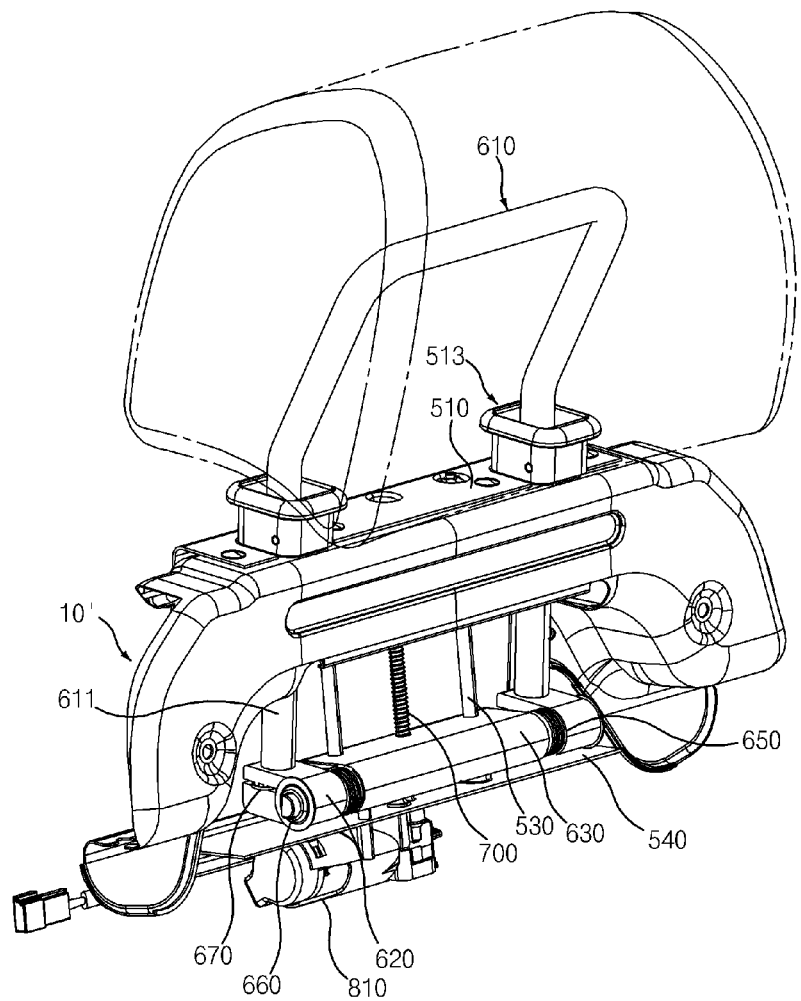
FIG. 13 is a front perspective view illustrating the assembled state of the headrest moving device of FIG. 10.
Figure 16:
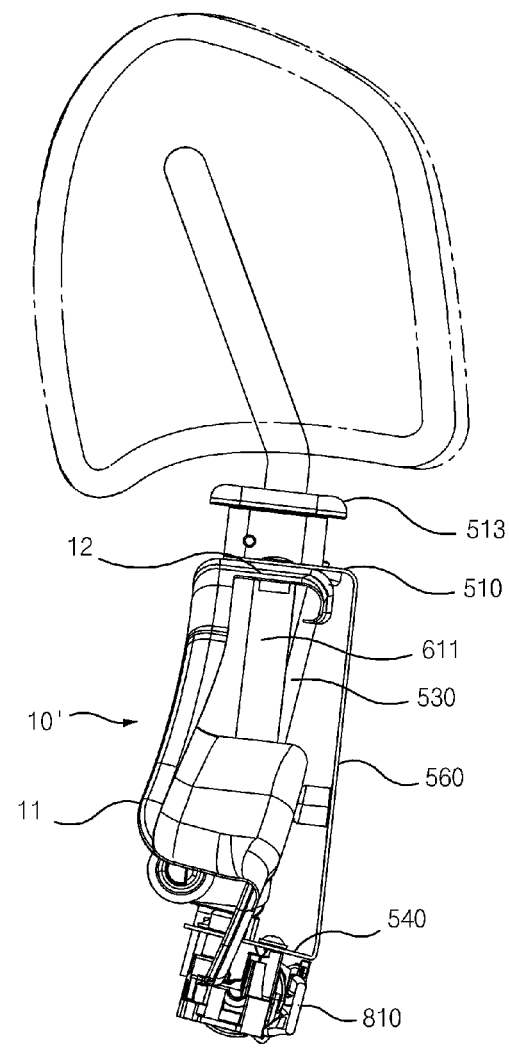
FIG. 16 is a side view of FIG. 13.

As shown in FIG. 12, the shaft 640 has a cylindrical shape, with an end 641 having a semicircular cross-section being defined in each end of the shaft.

A push nut 660 is fitted over each end of the shaft 640, so that it is possible to prevent the shaft 640 from becoming removed from the mounting holder 620.

The mounting holder 620 is placed at a location below the vertical rod 611 of the stay rod 610.

The mounting holder 620 has a vertical insert hole 625, into which the vertical rod 611 of the stay rod 610 is inserted, with a second insert hole 626 being laterally formed in the mounting holder and receiving the semicircular end 641 of the shaft 640. A first protrusion 623 is provided in the mounting holder such that the first protrusion surrounds the second insert hole 626. A second protrusion 624 having an arc-shape is provided along the circumference of the end of the first protrusion 623.

The second insert hole 626 has a semicircular shape corresponding to the shape of the semicircular end 641, so that it is possible to prevent the mounting holder 620 from being rotated relative to the shaft 640.

Further, the mounting holder 620 is provided with a first fitting slot 621 and a second fitting slot 622, which communicates with the insert hole 625.

A clip 670, which is inserted into the fitting hole formed in the vertical rod 611 of the stay rod 610, is fitted into the second fitting slot 622. The clip 670 has a C-shape, in which opposite ends are bend outwards. Due to the clip 670, the vertical rod 611 can be prevented from being removed from the mounting holder 620.

The connector 630 is placed between the opposite mounting holders 620.

The rear part of the center of the connector 630 is provided with a screw hole 631, which engages with the screw 700 in a screw manner of engagement. First through holes 632, through which respective support units 530 pass, are formed in the opposite sides of the rear part of the connector. A second through hole 633, through which the shaft 640 passes, is axially formed through the front part of the connector. Further, an insert groove 635 for receiving the second protrusion 624 is formed in each end of the front part of the connector such that the insert groove communicates with the second through hole 633. The connector 630 also has respective fitting holes 634 in opposite end surfaces thereof.

The headrest moving device further has a spring 650, which is connected at a first end thereof to the connector 630 by being fitted into the fitting hole 634 and is connected at a second end thereof to the mounting holder 620 by being fitted into the first fitting slot 621.

The spring 650 uses a coil spring, which is fitted over the first protrusion 623.

The headrest moving device further has a stopper, which limits the rotating angle of the mounting holder 620 relative to the connector 630.

In this embodiment, the stopper may be an insert groove 635, which is formed in the connector 630 and receives the second protrusion 624 of the mounting holder 620 therein.

The insert groove 635 is configured in the form of an arc-shaped groove, in which the central angle of the arc-shaped insert groove is larger than that of the second protrusion 624. Therefore, the second protrusion 624 is limitedly moved within the insert groove 635. When the second protrusion 624 is intended to move to an angle exceeding the central angle, the second protrusion 624 is stopped by the connector 630 and thereby the mounting holder 620 can be prevented from being rotated relative to the connector 630.

Due to the spring 650, even when the mounting holder 620 is rotatably connected to the connector 630 with no external force imposed thereon, the mounting holder 620 can be maintained at a predetermined angle relative to the connector 630. Therefore, the vertical rod 611 of the stay rod 610 can be easily inserted into the insert hole 625 of the mounting holder 620, so that the headrest moving device can be easily assembled within a short period of time.

The screw 700 passes through the screw hole 631 of the connector 630 and, thereafter, passes at the upper end thereof through both the upper panel 12 and the upper plate 510, and passes at the lower end thereof through the lower plate 540.

The screw 700 is threaded around the outer circumferential surface thereof. The lower end of the screw is toothed around the outer circumferential surface.

The motor 800 rotates the screw 700 and thereby moves the movable unit upwards or downwards.

The motor 800 applies the rotating force to the screw 700 using both a first bevel gear and a second bevel gear engaging with the first bevel gear.

The first bevel gear is connected to the output shaft of the motor 800 and the second bevel gear is connected to the screw 700.

The second bevel gear is provided with an insert hole, into which the screw 700 is inserted. The inner surface of the insert holes of the second bevel gear has teeth and engages with the teeth formed around the lower end of the screw 700.

The motor 800 is mounted to the lower surface of the lower plate 540 using a motor mounting bracket 810.

As shown in FIGS. 17 through 20, in the headrest moving device of the present invention, at at least one height, the central axis C passing through both the center of the ejecting hole and the center of the insert hole is inclined relative to the screw 700, so that, when the connector 630 is moved upwards, both the mounting holder 620 and the tiltable member 550 are rotated counterclockwise around the connector 630, and thereby, when the connector 630 is moved upwards higher, the counterclockwise rotating angles of both the mounting holder 620 and the tiltable member 550 relative to the connector 630 becomes larger.

In other words, the operation of the headrest moving device of the present invention is such that the forward moving distance of the headrest 20 is negligible until the movable unit has reached a predetermined height. However, when the movable unit is moved upwards after having reached the predetermined height, the headrest 20 is quickly moved forwards. Therefore, when a passenger moves the movable unit upwards or downwards so as to adjust the height of the headrest 20, the distance that the headrest moves forward is negligible until the headrest has reached a predetermined height, so that the headrest moving device can prevent the passenger from feeling uncomfortable.

Hereinbelow, operation of the embodiment having the above-mentioned construction will be described.

When the motor 800 is started, the output shaft of the motor 800 is rotated and, at the same time, the first bevel gear rotates. Therefore, the second bevel gear engaging with the first bevel gear is rotated and thereby the screw 700 connected to the second bevel gear rotates.

When the screw 700 is rotated as described above, the movable unit can be moved upwards or downwards in accordance with a rotating direction of the screw.

In the above state, the stay rod 610 is moved upwards or downwards at the same time.

When the movable unit is moved upwards, the connector 630 is moved upwards. In the above state, the mounting holder 620 is rotated forwards with respect to the connector 630, so that the angle of the headrest 20 relative to a horizontal surface is changed.

Hereinbelow, the method of assembling the headrest moving device according to the fourth embodiment will be described.

The screw 700 is inserted into the screw hole 631 of the connector 630, the support unit 530 is inserted into the first through hole 632, and the shaft 640 is inserted into the second through hole 633.

After the support unit 530 is inserted into the first through hole of the mounting bracket, the upper and lower ends of the support unit 530 are tightened by respective nuts, thus mounting the support unit 530 to the mounting bracket.

Further, the screw 700 is inserted into the second through hole of the mounting bracket.

Further, the motor mounting bracket 810 is bolted to the lower plate 540 of the mounting bracket such that the lower end of the screw 700 can be inserted into the insert hole of the second bevel gear.

The spring 650 is fitted over the first protrusion 623 of the mounting holder 620 and the second end of the spring 650 is inserted into the first fitting slot 621 of the mounting holder 620.

Further, respective mounting holders 620 are fitted over the opposite ends of the shaft 640 and, at the same time, the first ends of respective springs 650 are fitted into respective fitting holes 634 formed in the opposite ends of the connector 630.

Respective push nuts 660 are tightened to the opposite ends of the shaft 640.

Further, the upper plate 510 of the mounting bracket is placed on the upper panel 12 of the seat frame 10' prior to riveting the upper plate to the upper panel.

The tiltable member 550 is seated in the seat groove of the ejector casing 513 and a pin is inserted into both the ejector casing 513 and the tiltable member 550.

The ejector casing 513 is fitted both into the through opening formed in the upper plate 510 of the mounting bracket and into the through opening formed in the upper panel 12 of the seat frame 10'.

Further, the vertical rod 611 of the stay rod 610 is inserted both into the tiltable member 550 and into the insert hole 625 of the mounting holder 620. In the above state, the position of the mounting holder 620 is fixed by both the spring 650 and the stopper such that the insert hole 625 is directed upwards.

The clip 670 is fitted both into the second fitting slot 622 of the mounting holder 620 and into the fitting hole of the vertical rod 611.

Therefore, the headrest moving device is completely assembled.

Hereinbelow, the method of controlling the headrest moving device according to the fourth embodiment will be described.

The headrest moving device is provided with a sensor capable of sensing the possibility of a car collision. A control unit of the device receives a signal output from the sensor and determines the probability of a car collision between this car and a following car, and uses the probability of the car collision to control the headrest moving device.

For example, when the probability of the car collision is determined to be less than 50% (a low probability of a car collision), the motor 800 is limitedly operated only when a passenger manually adjusts the height of the headrest 20 by pushing an actuating button of the headrest moving device (manual mode).

Figure 17:
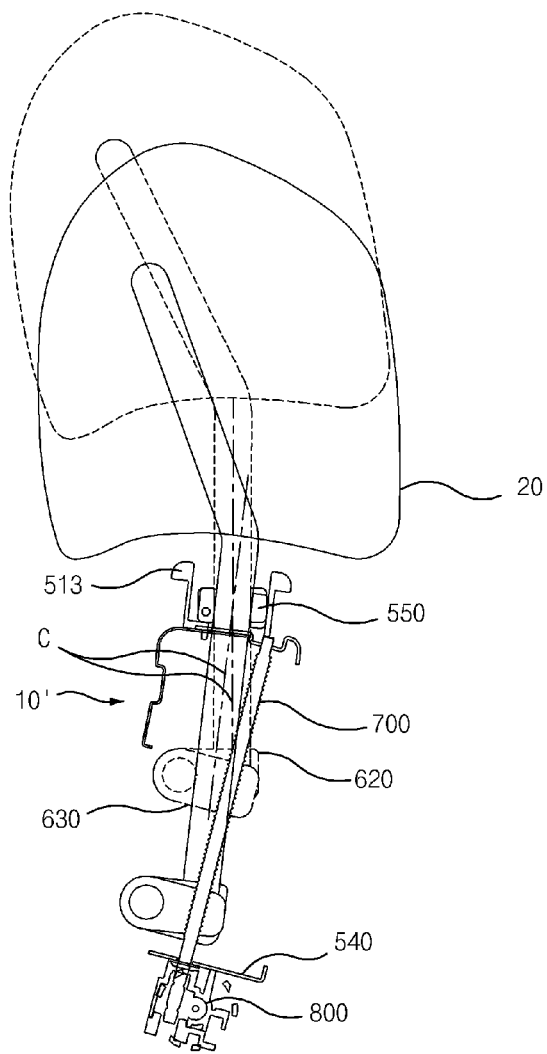
FIG. 17 is a view illustrating a trace of the headrest when a passenger adjusts the headrest.

When the passenger manually adjusts the height of the headrest 20 by actuating the motor 800 as described above, the headrest moving device may be preset such that the upward moving height of the movable unit is limited to a predetermined height. For example, as shown in FIG. 17, the headrest moving device may be preset such that the movable unit can be moved only to an extent in which the height of the headrest 20 has largely varied, but the forward movement of the headrest 20 is negligible. In the above state, when a passenger adjusts the height of the headrest 20, it is possible to prevent the headrest 20 from moving forwards to a large extent and thereby to prevent the passenger from feeling uncomfortable.

Figure 18:
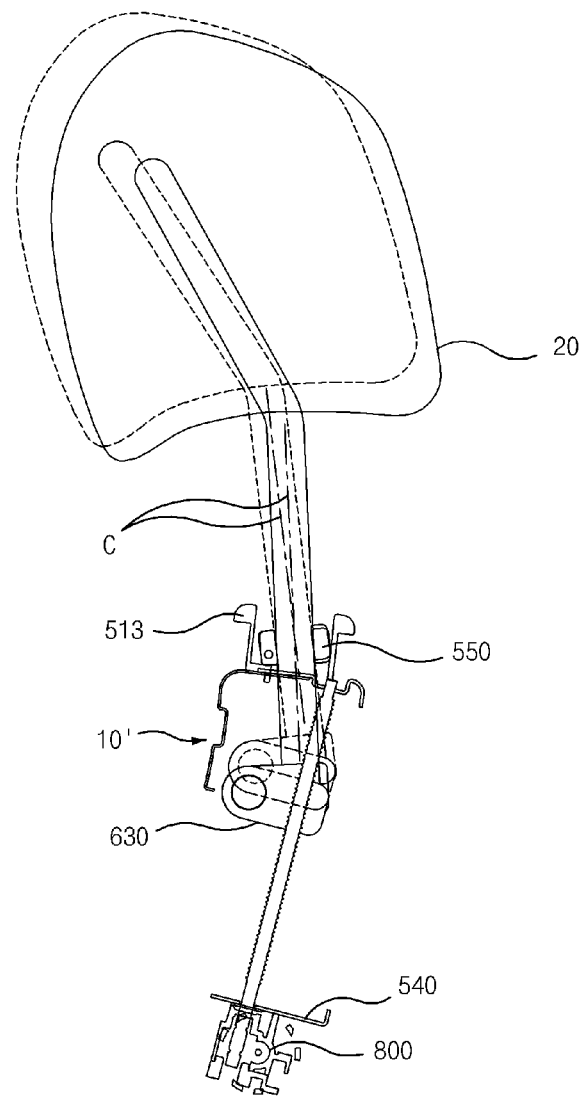
FIG. 18 is a view illustrating a trace of the headrest in pre-active mode.

When the probability of the car collision is determined to range from 50% to 80% (a middle probability of a car collision), the control unit operates the motor 800 and automatically moves the headrest 20 upwards to a predetermined height and, at the same time, moves it forwards, as shown in FIG. 18. When such a mode (pre-active mode) that is conducted in preparation for a car collision is included amongst the modes of the headrest moving device, the device can quickly and effectively respond to a real car collision.

Figure 19:
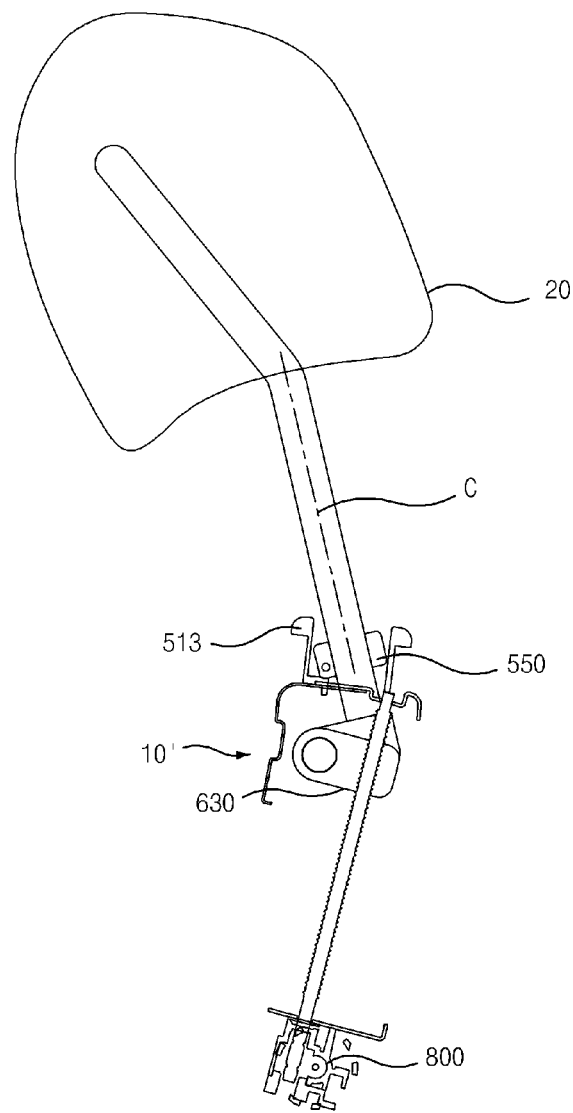
FIG. 19 is a view illustrating a trace of the headrest in active mode.

When the probability of the car collision is determined to be equal to or higher than 80% (a high probability of a car collision), the control unit further operates the motor 800 and moves the headrest 20 upwards to a maximum height and, at the same time, moves it forwards to a foremost position, as shown in FIG. 19, thus preventing the head of the passenger from leaning backwards (active mode).

Figure 20:
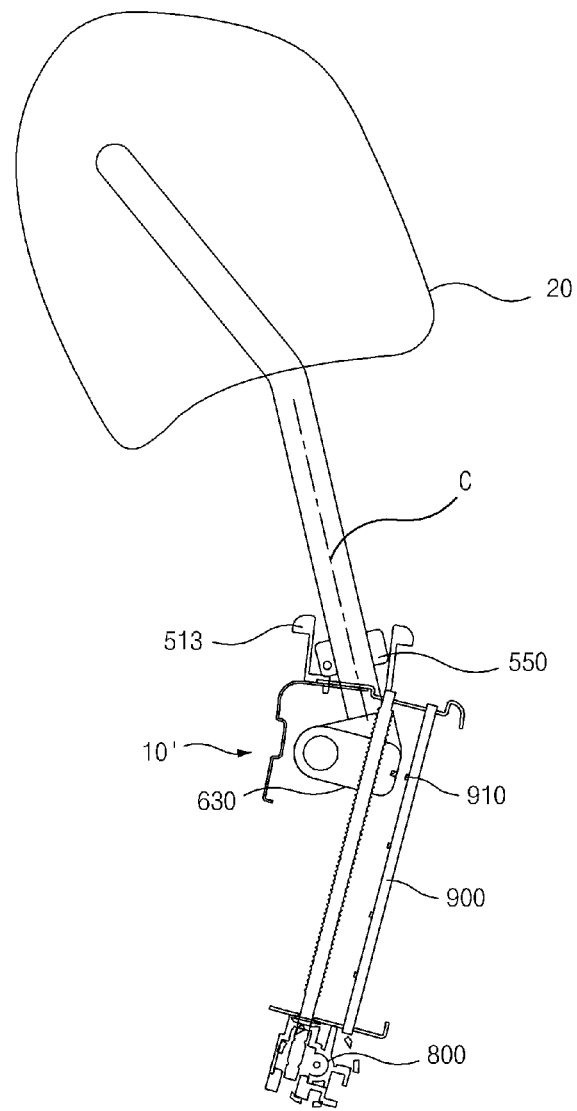
FIG. 20 is a view schematically illustrating a headrest moving device according to a fifth preferred embodiment of the present invention.

Further, the headrest moving device may further include a sensor 910 for sensing the height of the movable unit, as shown in FIG. 20. The sensor 910 outputs a signal to the control unit, thus allowing the control unit to control the motor 800.

The sensor 910 can sense the height of the movable unit by detecting a magnet mounted to the connector 630 of the movable unit. The sensor 910 may be mounted to a sensor holder 900, which is held by the upper plate 510 and the lower plate 540 of the mounting bracket at upper and lower ends thereof.

The sensor 910 may be a plurality of sensors, which are arranged at the minimum and maximum heights to which the movable unit can reach, at the manual mode height and the pre-active mode height, etc.

The sensors 910 may be arranged at the minimum and maximum heights to which the movable unit can reach, so that, when the movable unit has reached the minimum or the maximum height, the position of the movable unit can be sensed by a sensor, thus allowing the motor 800 to be prevented from being further operated, and thereby preventing the motor from overloading.

The sensors 910 may be arranged at regularly spaced heights, to which the movable unit in manual mode can reach, thus allowing a passenger to stepwisely adjust the height of the headrest.

Further, a sensor 910 may be arranged at a predetermined height to which the movable unit in the pre-active mode can reach, thus allowing the control unit to easily and quickly move the movable unit to the predetermined height.

Although the embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A headrest moving device, comprising:
   an ejector casing mounted to a seat frame;
   a tiltable member rotatably installed in the ejector casing;
   a stay rod connected to a headrest and passing through the tiltable member;
   a movable unit having a connector and a mounting holder rotatably coupled to the connector and connected to the stay rod;
   a screw engaged with the connector in a screw manner of engagement;
   a motor for rotating the screw, wherein the tiltable member can be tilted relative to the ejector casing and the mounting holder can be rotated relative to the connector,
   a spring connected to the connector at a first end thereof and connected to the mounting holder at a second end thereof; and
   a stopper for limiting an angle that the mounting holder rotates relative to the connector.

2. The headrest moving device as set forth in claim 1, wherein the mounting holder is provided with an insert hole, into which the stay rod is inserted, and the tiltable member is provided with an ejecting hole, through which the stay rod passes, wherein, at at least one height, a central axis passing through both a center of the ejecting hole and a center of the insert hole is inclined relative to the screw, so that, when the connector is moved upwards, both the mounting holder and the tiltable member are rotated counterclockwise relative to the connector.

* * * * *